US010155533B2

(12) United States Patent
Muramatsu (10) Patent No.: US 10,155,533 B2
(45) Date of Patent: Dec. 18, 2018

(54) MOTOR CONTROLLER AND ELECTRIC POWER STEERING USING SAME

(71) Applicant: DENSO CORPORATION, Kariya, Aichi-pref. (JP)

(72) Inventor: Rei Muramatsu, Nagoya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 407 days.

(21) Appl. No.: 14/792,861

(22) Filed: Jul. 7, 2015

(65) Prior Publication Data

US 2016/0009314 A1 Jan. 14, 2016

(30) Foreign Application Priority Data

Jul. 11, 2014 (JP) .................................. 2014-143144

(51) Int. Cl.
*B60W 10/04* (2006.01)
*B60W 40/12* (2012.01)
*B62D 5/04* (2006.01)
*H02P 29/68* (2016.01)

(52) U.S. Cl.
CPC ........... *B62D 5/0496* (2013.01); *B60W 10/04* (2013.01); *B60W 40/12* (2013.01); *H02P 29/68* (2016.02)

(58) Field of Classification Search
CPC .............................. B62D 5/0496; H02P 29/68
See application file for complete search history.

(56) References Cited

U.S. PATENT DOCUMENTS

| 2006/0266575 A1* | 11/2006 | Nagase | B62D 5/046 180/446 |
| 2011/0118937 A1* | 5/2011 | Kariatsumari | B62D 5/046 701/41 |
| 2011/0160965 A1* | 6/2011 | Oh | B62D 5/0481 701/42 |
| 2012/0144115 A1* | 6/2012 | Mitsuzumi | G11B 27/002 711/115 |

FOREIGN PATENT DOCUMENTS

| JP | H11-20718 A | 1/1999 |
| JP | 2005263010 | 11/2001 |
| JP | 2001328551 | 9/2005 |
| JP | 2010-198252 A | 9/2010 |

* cited by examiner

*Primary Examiner* — Jelani A Smith
*Assistant Examiner* — Charles J Han
(74) *Attorney, Agent, or Firm* — Knobbe, Martens, Olson & Bear, LLP (57) ABSTRACT

A motor controller includes a temperature estimator that estimates a temperature of an element in a motor driver circuit that drives a motor, or a temperature of a winding of the motor, and a non-volatile memory that provides a first area and a second area for storing the estimated temperature. The temperature estimator writes the estimated temperature to both of the first area and the second area.

4 Claims, 9 Drawing Sheets

MOTOR CONTROLLER AND ELECTRIC POWER STEERING USING SAME

CROSS REFERENCE TO RELATED APPLICATION

The present application is based on and claims the benefit of priority of Japanese Patent Application No. 2014-143144, filed on Jul. 11, 2014, the disclosure of which is incorporated herein by reference.

TECHNICAL FIELD

The present disclosure generally relates to a motor controller and an electric power steering device using such a motor controller.

BACKGROUND INFORMATION

Conventionally, the motor controller for controlling a motor performs an overheat protection control that limits the maximum electric current to be supplied to the motor based on an estimation of an element temperature or a motor winding temperature, so that the estimated temperature would not exceed an overheat prevention threshold. For example, a Japanese patent document laid open No. 2001-328551 (patent document 1) discloses such an overheat protection scheme. In such a motor controller that performs an overheat protection control, the temperature estimated immediately before ending the motor control is written to a non-volatile memory unit. Then, the motor control is resumed thereafter based on the information of the estimated temperature that is written in the non-volatile memory unit.

In the conventional technique of the patent document 1, when the writing of the estimated temperature (i.e., temperature data) to the non-volatile memory unit fails, the data being written to the memory unit is damaged. When the motor control is resumed with the data in the damaged state, the data will not be readable from the non-volatile memory, thereby preventing an accurate estimation of the element temperature. That may result in an unreliable heat protection control.

SUMMARY

It is an object of the present disclosure to provide a motor controller that is capable of securely reading an estimated temperature that is written in a non-volatile memory unit and to provide an electric power steering using such a controller.

In an aspect of the present disclosure, a motor controller includes a temperature estimator that estimates a temperature of an element in a motor driver circuit that drives a motor, or a temperature of a winding of the motor, and a non-volatile memory that provides a first area and a second area for storing the estimated temperature. The temperature estimator writes the estimated temperature to both of the first area and the second area.

According to the above, when the writing of the estimated temperature to one of the first area and the second area fails, even if the estimated temperature cannot be read from one of the two areas, the estimated temperature can still be readable from the other area. Therefore, the motor controller of the present disclosure can safely read the estimated temperature written to the non-volatile memory unit. Thus, based on the estimated temperature read therefrom, the estimated temperature is calculated, and the overheat protection control for the element in the motor driver circuit and/or the motor winding is appropriately performed based on the calculation of the estimated temperature.

BRIEF DESCRIPTION OF THE DRAWINGS

Objects, features, and advantages of the present disclosure will become more apparent from the following detailed description made with reference to the accompanying drawings, in which.

DETAILED DESCRIPTION

Hereafter, the embodiment which applied the motor controlling device by the present disclosure to the electric power steering device of vehicles is described based on the drawings.

First Embodiment

The electric power steering device in the first embodiment of the present disclosure is explained with reference to FIGS. 1-5.

Figure 2:
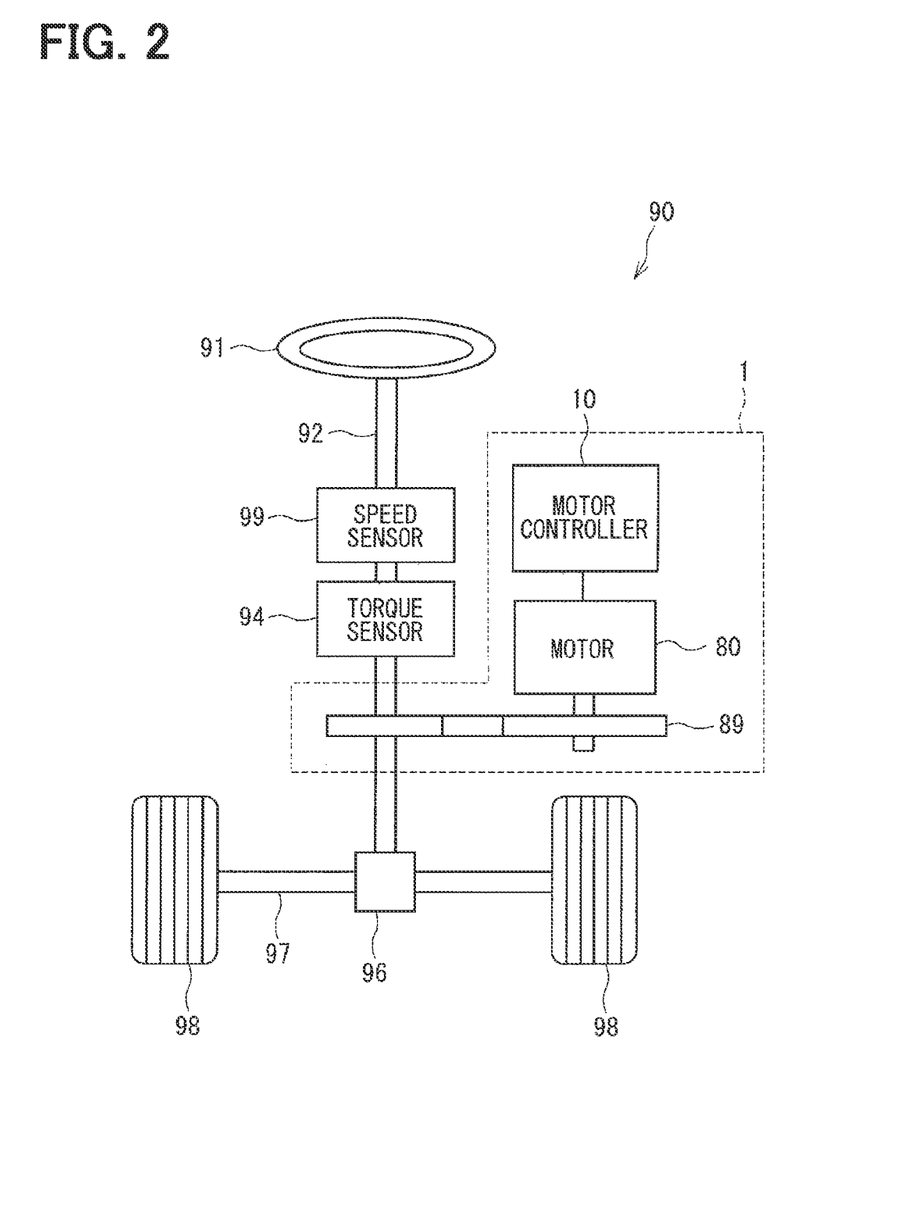
FIG. 2 is an illustration of a steering system to which an electric power steering device in the first embodiment of the present disclosure is applied.

FIG. 2 shows an illustration (i.e., the entire configuration) of a steering system 90 provided with an electric power steering device 1. A torque sensor 94 for detecting a steering torque is installed on a steering shaft 92 connected to a steering wheel 91. A pinion gear 96 is disposed at a tip of the steering shaft 92, and the pinion gear 96 engages a rack shaft 97. A pair of wheels 98 are rotatably attached to both ends of the rack shaft 97 via the tie rod and other parts. Rotational movement of the steering shaft 92 is turned into a translational movement of the rack shaft 97 by the pinion gear 96, and the pair of wheels 98 are steered by an angle according to a displacement of the translational movement of the rack shaft 97.

The electric power steering device 1 includes a motor controller 10, a motor 80, and a speed reduction gear 89.

The motor controller 10 controls the motor 80 based on a steering torque signal Tq from the torque sensor 94, a speed signal Vel from a speed sensor 99, etc. The motor 80 in the present embodiment is a direct current (DC) motor, generates a steering assist torque for assisting a steering operation of the steering wheel 91 by a driver, and rotates the speed reduction gear 89 in both directions (i.e., in a forward and backward direction). The speed reduction gear 89 reduces a rotation speed of the output shaft of the motor 80, and transmits the rotation to the steering shaft 92.

Figure 1:
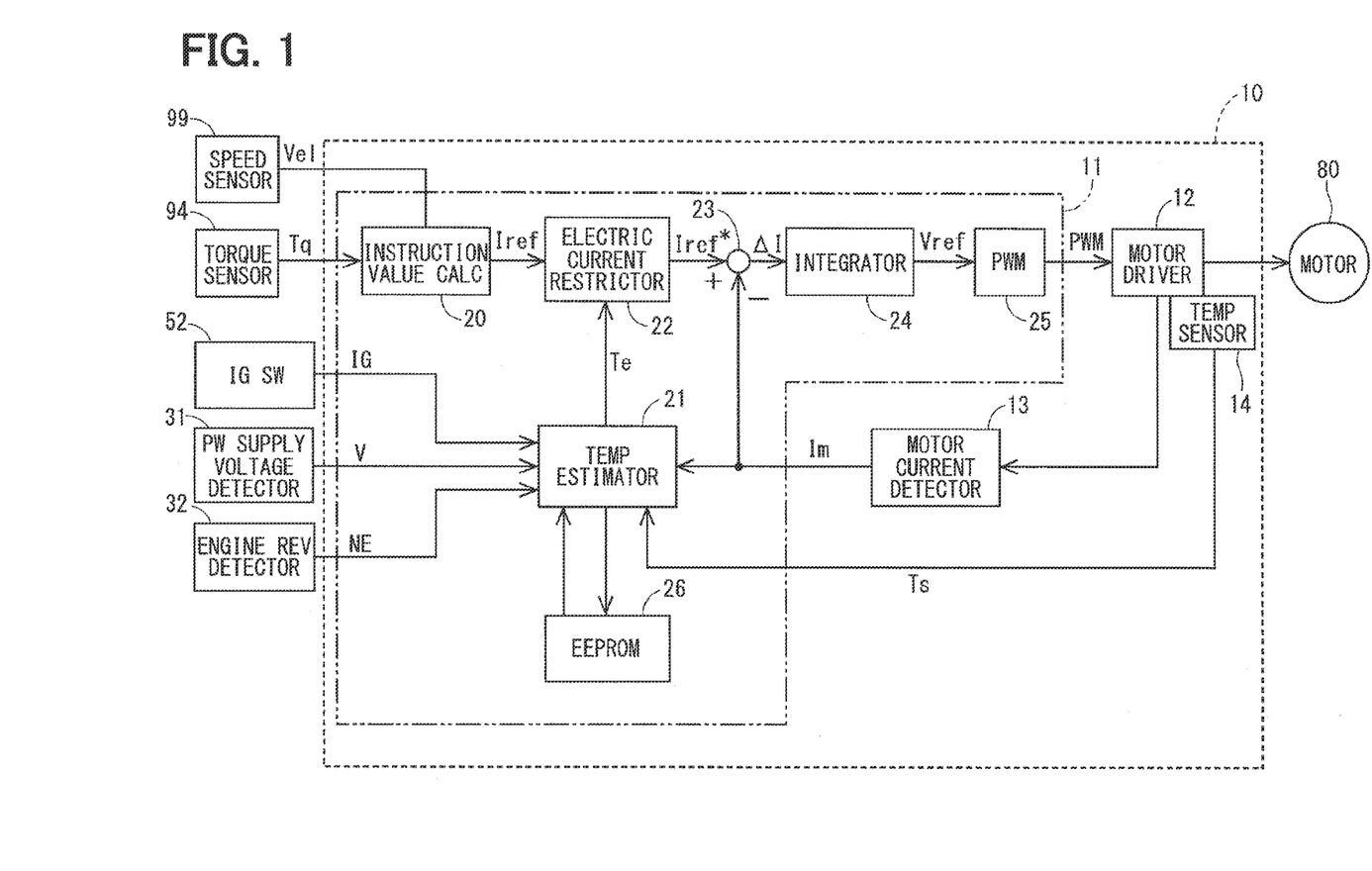
FIG. 1 is a block diagram of a motor controller in a first embodiment of the present disclosure.

Next, the control blocks of the motor controller 10 are described with reference to FIG. 1.

The motor controller 10 is provided with a control unit 11, a motor drive circuit 12, (i.e., a motor driver 12 hereafter) a motor current detector 13, and a temperature sensor 14.

The control unit 11 comprises a microcomputer, a drive circuit, (i.e., a pre-driver) etc., calculates each of the calculation values concerning a control of the motor driver 12 based on input signals, e.g., based on the steering torque signal Tq and the speed signal Vel, and outputs a voltage instruction value Vref to the motor driver 12.

The motor driver 12 in the present embodiment is an H bridge circuit constituted by two or more switching elements, and supplies electric power to the motor 80 based on the voltage instruction value Vref. The switching element is implemented as a metal oxide semiconductor field effect transistor (MOSFET), for example.

The motor current detector 13 detects the motor current supplied to the motor 80 from the motor driver 12, and inputs a motor current detection value Im to a subtraction part 23 mentioned below.

The temperature sensor 14 is mounted, for example on the substrate of the motor driver 12, and detects a heat generated by the switching element (i.e., simply referred to as "element" hereafter) of the motor driver 12.

A detected temperature Ts detected by the temperature sensor 14 is inputted to a temperature estimator 21 mentioned below. The detected temperature Ts by the temperature sensor 14 is not the temperature of the element of the motor driver 12 itself, but is the temperature of the ambient air of the element.

Next, the details of the control unit 11 are described with reference to FIG. 1.

The control unit 11 includes an instruction value calculator 20, the temperature estimator 21, an electric current restrictor 22, a subtraction part 23, a proportional integrator 24, a Pulse Width Modulation (PWM) part 25, and an Electrically Eraseable Programmable Read-Only Memory (EEPROM) 26 equivalent to a "non-volatile memory" in the claims.

The instruction value calculator 20 calculates a current instruction value Iref based on, for example, the speed signal Vel which is inputted from the speed sensor 99, the steering torque signal Tq which is inputted from the torque sensor 94 and the like.

The temperature estimator 21 calculates an estimated temperature Te (i.e., TEMP ESTIMATION Te in the drawings) of the element of the motor driver 12 based on the detected temperature Ts inputted from the temperature sensor 14. How to calculate the estimated temperature Te is well-known in the art, thereby detailed description of the calculation method is not provided. The temperature estimator 21 calculates the estimated temperature Te continuously, while the motor controller 10 controls the motor 80.

The electric current restrictor 22 calculates a current limit value Iref* which is used as the upper limit of the current instruction value Iref. Specifically, in the present embodiment, when the estimated temperature Te inputted from the temperature estimator 21 goes up, the electric current restrictor 22 performs a calculation by which the current limit value Iref* is lowered, for the prevention of the overheating of the element of the motor driver 12, The subtraction part 23, the proportional integrator 24, and the PWM part 25 are used as a well-known configuration of an electric current feedback control. The subtraction part 23 inputs the difference between the current limit value Iref* and the motor current detection value Im to the proportional integrator 24.

The proportional integrator 24 calculates the voltage instruction value Vref so that the inputted difference converges to zero.

The PWM part 25 outputs a PWM signal to the motor driver 12 based on the voltage instruction value Vref.

The EEPROM 26 has two areas which can memorize the estimated temperature Te. One of the two areas is designated as a first area, and the other one of two areas is designated as a second area. The first area and the second area are distinguished, for example, by the address.

An electric power is supplied to the motor controller 10, which has the above-mentioned configuration, via an ignition switch 52 and the like. When the ignition switch 52 is turned to OFF, for example, and the supply of the electricity to the control unit 11 is intercepted, the control unit 11 performs a reset operation. At the time of turning OFF of the ignition switch 52, "a power latch" by which the supply of the electricity to the control unit 11 is maintained for a predetermined period may be performed.

Further, if a cranking of the engine is performed after a stall of an engine, the cranking of the engine induces a large electric current flowing to a starter motor, which causes a large drop of the voltage of the power supply. By such a large drop of the voltage, the control unit 11 is reset.

By the reset of the control unit 11, the estimated temperature Te calculated by the temperature estimator 21 so far is erased. Thus, in the present embodiment, the temperature estimator 21 writes the estimated temperature Te to the EEPROM 26 before the reset operation. Then, at a time when the control unit 11 reboots/restarts, the temperature estimator 21 reads the estimated temperature Te previously stored to the EEPROM 26, and resumes the calculation of the estimated temperature Te, by using such value as an initial value. The details of the write process and the read process are described below.

Write Process

Figure 3:
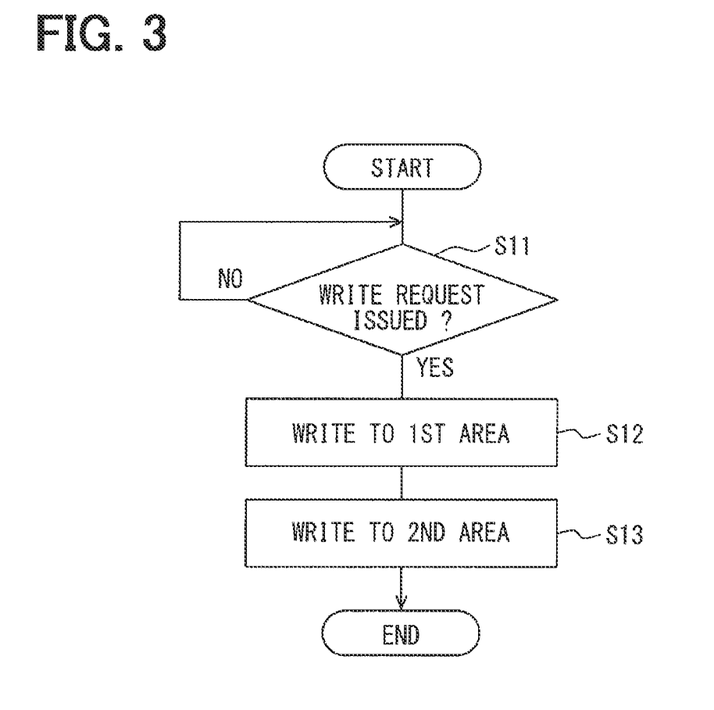
FIG. 3 is a flowchart of a write process of an estimated temperature in the first embodiment of the present disclosure.

With reference to the flowchart shown in FIG. 3, the write process of the estimated temperature Te performed by the temperature estimator 21 is described. Hereafter, the sign "S" represents a "step" in the description of the flowchart.

First, the temperature estimator 21 determines whether a write request of the estimated temperature Te (S11) has been issued, for example, by the temperature estimator 21. Although the second embodiment explains the details about the example of a write request, the write request is issued at least once before the control unit 11 is reset.

When it is determined that the write request has been issued by the temperature estimator 21 (S11:YES), at such moment of determination, the estimator 21 writes the estimated temperature Te first to the first area of the EEPROM 26 (S12), and then writes Te to the second area (S13). The write process completes by the writing of Te to both of the two areas.

On the other hand, when it is determined that the write request has not been issued (S11:NO), the temperature estimator 21 repeats S11 until it is determined that the write request has been issued.

The above-mentioned write process is repeatedly performed, while the motor controller 10 controls the motor 80. According to the write process of the second time and thereafter, an already-stored estimated temperature Te in each of the first area and the second area is overwritten.

Read Process

Figure 4:
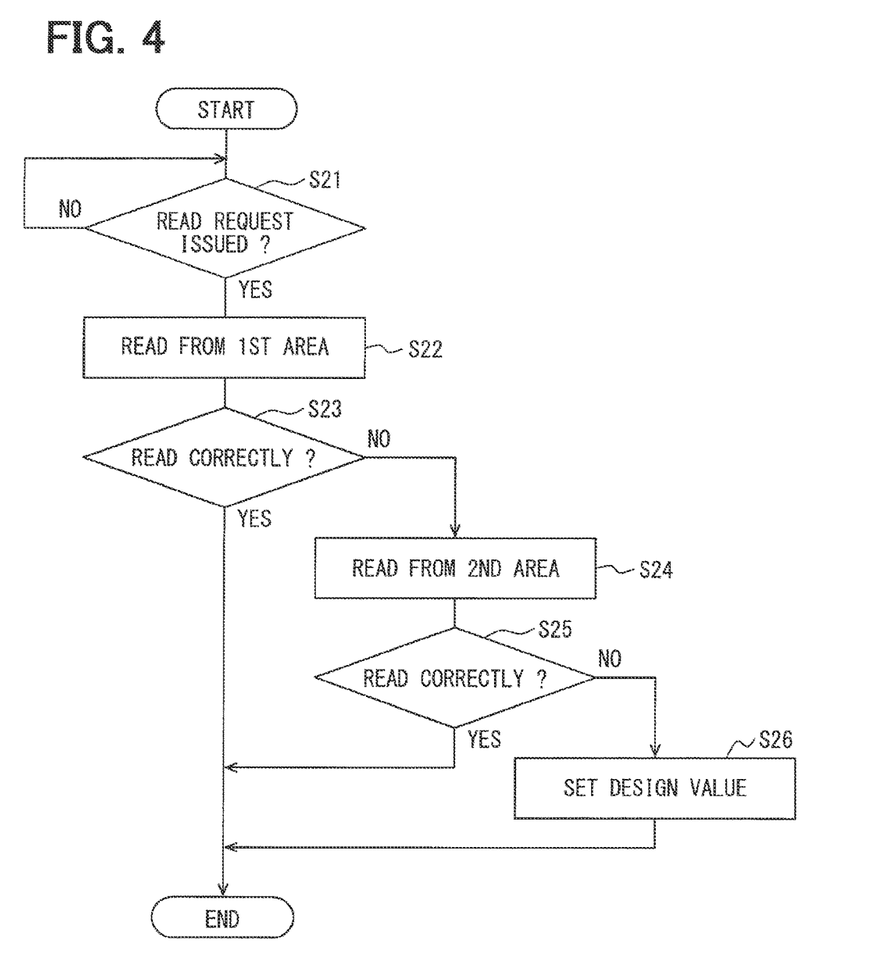
FIG. 4 is a flowchart of a read process of the estimated temperature in the first embodiment of the present disclosure.

Next, the read process of the estimated temperature Te is described with reference to the flowchart of FIG. 4.

First, the temperature estimator 21 determines whether a read request of the estimated temperature Te (S21) has been issued. For example, such a determination is performed, (i.e., that the read request has been issued by the temperature estimator 21) at the time of the reboot/restart of the control unit 11.

When it is determined that the read request has been issued by the temperature estimator 21 (S21:YES), the read process of reading the first area of EEPROM 26 is performed (S22).

On the other hand, when it is determined that the read request has not been issued in S21 (S21:NO), S21 is repeated until it is determined that the read request is issued.

It is then determined, after S22, whether the temperature estimator 21 has correctly read the estimated temperature Te from the first area (S23). Whether or not the read process is correct is determined based on, for example, a checksum of the read data. Hereafter, the same checksum method is used for the correctness examination of the read process. When it is determined that the estimated temperature Te is correctly read from the first area (S23:YES), the read process ends.

On the other hand, when it is determined that the estimated temperature Te has not been correctly read from the first area in S23 (S23:NO), the process shifts to S24. In S24, the temperature estimator 21 performs the read process of reading the second area of the EEPROM 26.

It is then determined, after S24, whether the temperature estimator 21 has been correctly read the estimated temperature Te from the second area (S25). When it is determined that the estimated temperature Te been correctly read from the second area (S25:YES), the read process ends.

When it is determined, on the other hand, that the estimated temperature Te has not been correctly read from the second area in S25 (i.e., when the estimated temperature Te could not be read/retrieved from the first area or the second area of the EEPROM 26) (S25:NO), the process shifts to S26. In S26, the temperature estimator 21 sets a design value as the estimated temperature Te, and ends the read process.

Operation of the Temperature Estimator 21

Figure 5:
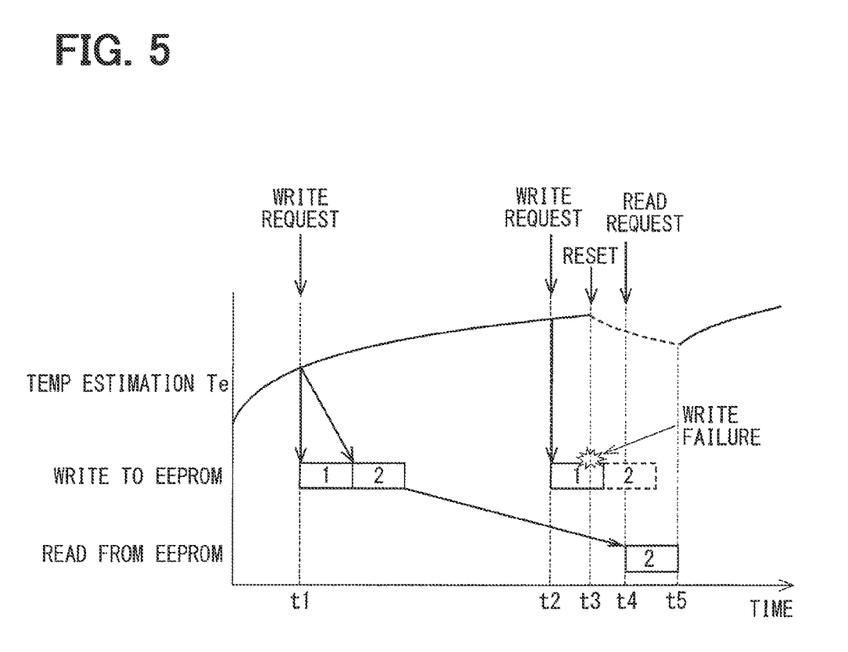
FIG. 5 is a time diagram of the write process and the read process of the estimated temperature in the first embodiment of the present disclosure.

Next, with reference to the time diagram of FIG. 5, an example of the operation of the temperature estimator 21 is described.

The time diagram of FIG. 5 shows a write timing and a read timing of the estimated temperature Te to and from the EEPROM 26, together with the time change of Te, as a graph of the vertical axis representing temperature and the horizontal axis representing a lapse of time.

Since the calculation of the estimated temperature Te is repeated continuously, it is shown by a solid line in FIG. 5. Further, the writing of the estimated temperature Te and the reading thereof in FIG. 5 are represented by a boxed "1" and a boxed "2" in squares, the numbers in the boxes representing the write-to or read-from areas.

For example, as shown in FIG. 5, suppose that a write request has been issued at time t1. At such timing, the temperature estimator 21 determines that the write request has been issued (S11:YES), and performs steps S12 and thereafter. Thereby, the estimated temperature Te currently calculated at time t1 is written to the first area and to the second area of the EEPROM 26, respectively.

Then, suppose that the subsequent write process is issued at time t2. At such timing, the temperature estimator 21 determines that the write request has been issued (S11:YES), and starts to perform steps S12 and thereafter.

However, this time, while the estimated temperature Te of time t2 is written to the first area of the EEPROM 26, the control unit 11 is reset at time t3, thereby writing to the first area fails and the data in the first area is damaged. Further, the subsequent writing to the second area will not be performed. The calculation of the estimated temperature Te temporarily stops at time t3 in such situation.

Then, at time t4, if the control unit 11 reboots/restarts, the temperature estimator 21 determines that the read request has been issued (S21), and performs step S22 and thereafter. Here, the temperature estimator 21 reads the estimated temperature Te from the second area where data is safely stored.

At time t5, the temperature estimator 21 resumes the calculation of the estimated temperature Te based on the estimated temperature Te read from the second area.

Effectiveness

As mentioned above, in the first embodiment, whenever a write request is issued, the estimated temperature Te is written to both of the first area and the second area of the EEPROM 26.

Therefore, in the first embodiment, even when writing to one of the first area and the second area fails, the estimated temperature Te stored in the other area is securely readable after the reboot/restart of the control unit 11. Therefore, the estimated temperature Te is securely read. Further, based on the read value, the estimated temperature Te is calculable, and an overheat protection control of the element of the motor driver 12 is appropriately performable. In other words, according to the first embodiment, reliability of an overheat protection control for protecting the switching element of the motor driver 12 is improved.

Second Embodiment

The second embodiment of the present disclosure is described with reference to FIG. 6.

The motor controller 10 in the second embodiment is characterized in that the timing of the write process and the electric current restriction method of the electric current restrictor 22 are modified from those in the first embodiment. The configuration of the motor controller 10 is substantially the same as the configuration in the first embodiment.

The operation of the motor controller 10 in the second embodiment is described with reference to the time diagram of FIG. 6.

Figure 6:
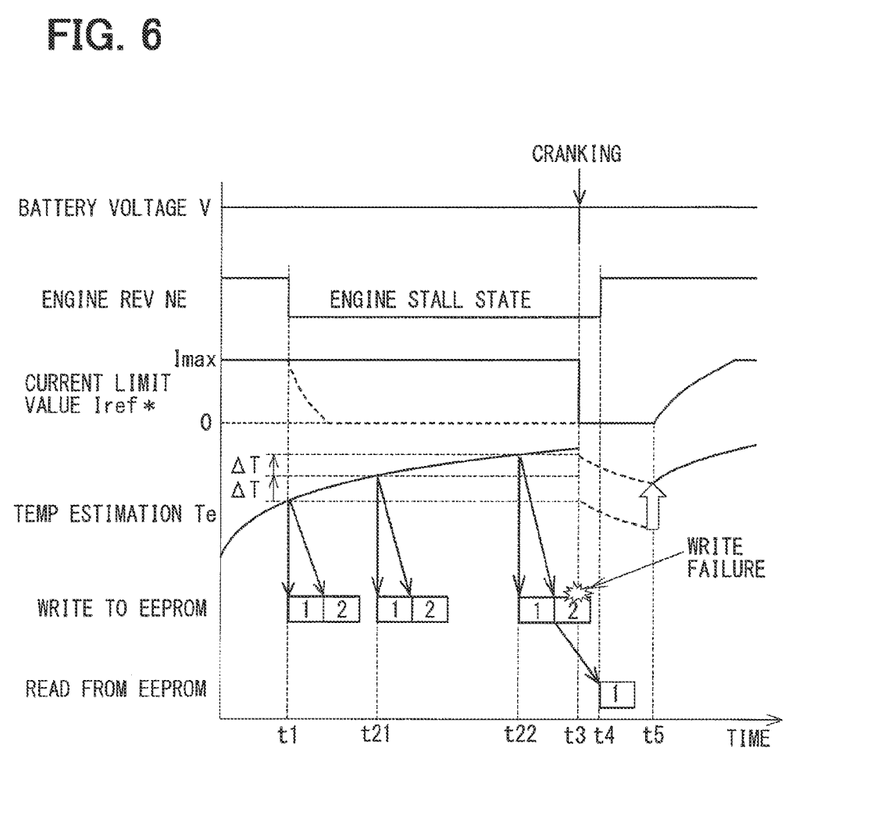
FIG. 6 is a time diagram of an operation of the motor controller in a second embodiment of the present disclosure.

The time diagram of FIG. 6 is a graph with the horizontal axis of lapse time and the vertical axis of a battery voltage V, an engine revolution number NE, a current limit value Iref*, a time change of the estimated temperature Te, and the write timing and the read timing of the estimated temperature Te to and from the EEPROM 26. The use of a solid line for representing Te and the boxed numbers "1" and "2" for representing the read/write areas is the same as the first embodiment in FIG. 5.

For example, if an engine stall occurs at time t1, the engine revolution number NE falls down to zero. At such timing, by detecting the engine stall state based on the engine revolution number NE inputted from an engine revolution detector 42, the temperature estimator 21 determines that the write request has been issued (S11:YES), and performs steps S12 and thereafter. Thereby, the estimated temperature Te currently calculated at time t1 is written to the first area and the second area of the EEPROM 26, respectively.

Here, the conventional motor controller sets the current limit value Iref* to zero after the engine stall, and ends the motor control. In FIG. 6, a dotted line shows the time change of the current limit value Iref* by the conventional technique.

On the other hand, in the motor controller 10 in the second embodiment of the present disclosure, the electric current restrictor 22 maintains the current limit value Iref* to a rated value Imax of a normal drive time. Hereafter, an example is described in which the motor 80 is driven in the engine stall state and the estimated temperature Te goes up.

At time t21 in the engine stall state, suppose that the estimated temperature Te has risen to a high value which is higher than the previous write value by a preset temperature difference ΔT (i.e., has risen from a time-t1 value to a time-t21 value). At such timing, the temperature estimator 21 determines that the write request has been issued (S11:YES), and starts to perform steps S12 and thereafter. Thereby, the estimated temperature Te calculated at time t21 is overwritten to the first area and the second area of the EEPROM 26, respectively.

Then, at time t22 still in the engine stall state, suppose that the estimated temperature Te has risen to the next value that is higher than the time-t21 value by the preset temperature difference ΔT (i.e., to a time-t22 value). At such timing, the temperature estimator 21 determines that the write request has been issued (S11:YES), and starts to perform steps S12 and thereafter.

However, suppose that the following incident happens, that is, while the estimated temperature Te of time t22 is written to the second area of the EEPROM 26, a cranking is performed at time t3. At such timing, the control unit 11 is reset, thereby the writing to the second area fails. Thus, although the estimated temperature Te stored in the first area is overwritten, the data in the second area is damaged.

After the reset of the control unit 11 at time t3, the calculation of the estimated temperature Te is temporarily stopped, and the current limit value Iref* falls down to zero. In FIG. 6, a dotted line shows imaginary values, which interpolates a calculation-end-time value and a calculation-resume-time value.

Then, at time t4, when the control unit 11 reboots/restarts, the temperature estimator 21 determines that the read request has been issued (S21), and performs steps S22 and thereafter. Here, the temperature estimator 21 reads the estimated temperature Te estimated at time t22 from the first area where data is safely stored.

At time t5, the temperature estimator 21 resumes the calculation of the estimated temperature Te based on the reading of the estimated temperature Te. Further, the electric current restrictor 22 performs the calculation of the current limit value Iref* based on the estimated temperature Te calculated by the temperature estimator 21. Thereby, the motor controller 10 is enabled to resume the control of the motor driver 12.

Effectiveness (1) According to the second embodiment, in the engine stall state, when the estimated temperature Te calculated in such state has changed to a value that is higher than the previous write time by the preset temperature difference ΔT, it is determined that the write request has been issued and the estimated temperature Te at such timing is overwritten to both of the first area and the second area of the EEPROM 26.

According to such a write process, the estimated temperature Te is overwritten to the first and second areas of the EEPROM 26 at a timing as close as possible to, (i.e., immediately before) the reset timing of the control unit 11. Therefore, after the reboot/restart of the control unit 11, the estimated temperature Te is more accurately calculable.

For example, in FIG. 6, a white arrow shows the difference between Te estimated based on the time-t1 value and Te estimated based on the time-t22 value, which means that, the estimated temperature Te in the present embodiment is more accurate and close to an actual temperature by an amount indicated by the white arrow in comparison to the conventional technique.

Further, when the estimated temperature Te does not change, the EEPROM 26 will not be overwritten. Therefore, the life of the EEPROM 26 is extended.

Further, even when the cranking is performed during the overwrite processing to one of the first area and the second area and such overwriting has failed, the control unit 11 can read Te from the other area after the reboot/restart. Therefore, just like the first embodiment, the estimated temperature Te is safely readable.

(2) The conventional motor controller does not overwrite the estimated temperature Te during the engine stall period, once it has written Te to the EEPROM at the engine stall timing. Further, even in case that the overwriting is performed during the engine stall period, if the cranking is performed during such overwrite process and the reset of the control unit 11 is caused, the estimated temperature Te will be damaged and become un-readable.

Therefore, in order to resume calculation of the estimated temperature Te correctly at the time of reboot/restart, the conventional motor controller is required to keep the temperature of the motor driver element to stay close to the stored temperature in the EEPROM, which is the temperature at the engine stall timing. Therefore, the conventional motor controller stops the motor control as soon as possible after the engine stall by setting the current limit value Iref* to zero, in order to prevent the temperature rise of the motor driver element.

On the other hand, the motor controller 10 in the second embodiment keeps the current limit value Iref* to a value of the normal drive time, and continues the control of the motor 80 in the engine stall period.

Such a control is enabled because the estimated temperature Te is overwritten to the EEPROM during the engine stall period, without running the risk of making the data un-readable, if the temperature of the element in the motor driver 12 rises as described above under the item (1). Therefore, it is not required to set the current limit value Iref* to zero, as the conventional technique.

Thus, according to the second embodiment, in case that the engine stall state is caused during the travel of the vehicle on the road, the power assist from the electric power steering device 1 is still usable for a retreat of the vehicle to a safe position on the road, by continuing the control of the motor driver 12 (i.e., by keeping the current limit value Iref* to a value of the normal drive time).

(3) During the engine stall period, in case that the power assist for the steering wheel operation is provided by the electric power steering device 1, the motor 80 receives a large electric current, thereby causing the rise of the estimated temperature Te as shown in FIG. 6.

During an engine operation time, the current limit value Iref* is lowered according to the rise of the estimated temperature Te. However, in the configuration of the second embodiment, the current limit value Iref* in the engine stall period is kept to the rated value Imax of the normal drive time. Thereby, the power assist for the retreat travel of the vehicle is prioritized than the overheat protection control.

Third Embodiment

The third embodiment of the present disclosure is described with reference to FIGS. 7 to 9.

The motor controller 10 of the third embodiment performs processing that is modified from the write process and the read process in the first embodiment one step further. In addition, the EEPROM 26 is further provided with a setup storage area that stores a setup of "a previous write area," (i.e., a data indicating which one of the first area or the second area the temperature Te has previously written to). Still further, the configuration of the motor controller 10 in the third embodiment is substantially the same as the configuration in the first embodiment.

Write Process

Figure 7:
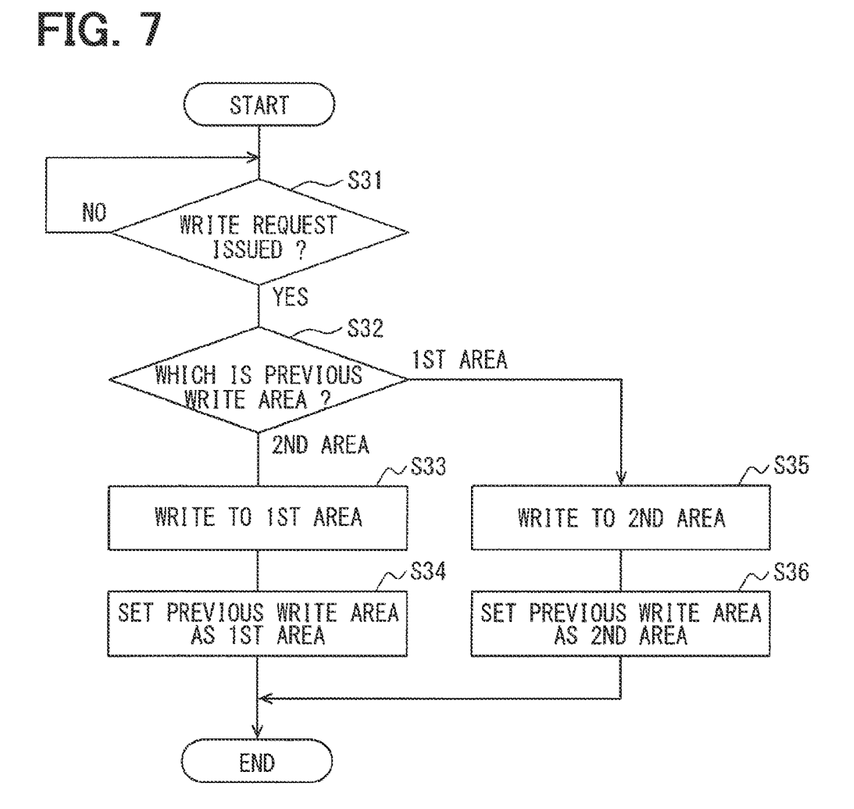
FIG. 7 is a flowchart of the write process of the estimated temperature in a third embodiment of the present disclosure.

Hereafter, with reference to the flowchart of FIG. 7, the write process of the estimated temperature Te performed by the temperature estimator 21 is described.

First, the temperature estimator 21 determines whether the write request of the estimated temperature Te has been issued (S31). An example of the write request is the same as the second embodiment.

When the temperature estimator 21 determines that the write request has been issued (S31:YES), with reference to the setup storage area of the EEPROM 26, it is determined that "the previous write area" is set to which one of the first area and the second area (S32).

On the other hand, when it is determined that the write request has not been issued (S31:NO), the process returns to S31, and S31 is repeated until it is determined that the write request has been issued.

When it is determined that "the previous write area" is set as the second area in S32 (S32:2ND AREA), the temperature estimator 21 writes the estimated temperature Te at the moment of such determination to the first area of the EEPROM 26 (S33). Then, the temperature estimator 21 sets "the previous write area" as the first area (S34). The write process completes by the above.

Further, when it is determined that "the previous write area" is set as the first area in S32 (S32:1ST AREA), the temperature estimator 21 writes the estimated temperature Te at the moment of such determination to the second area of the EEPROM 26 (S35). Then, the temperature estimator 21 sets "the previous write area" as the second area (S36). The write process completes by the above.

The above-mentioned write process is repeatedly performed, while the motor controller 10 controls the motor 80. According to the write process of the second time and thereafter, the estimated temperature Te is overwritten to the first area and to the second area.

Read Process

Figure 8:
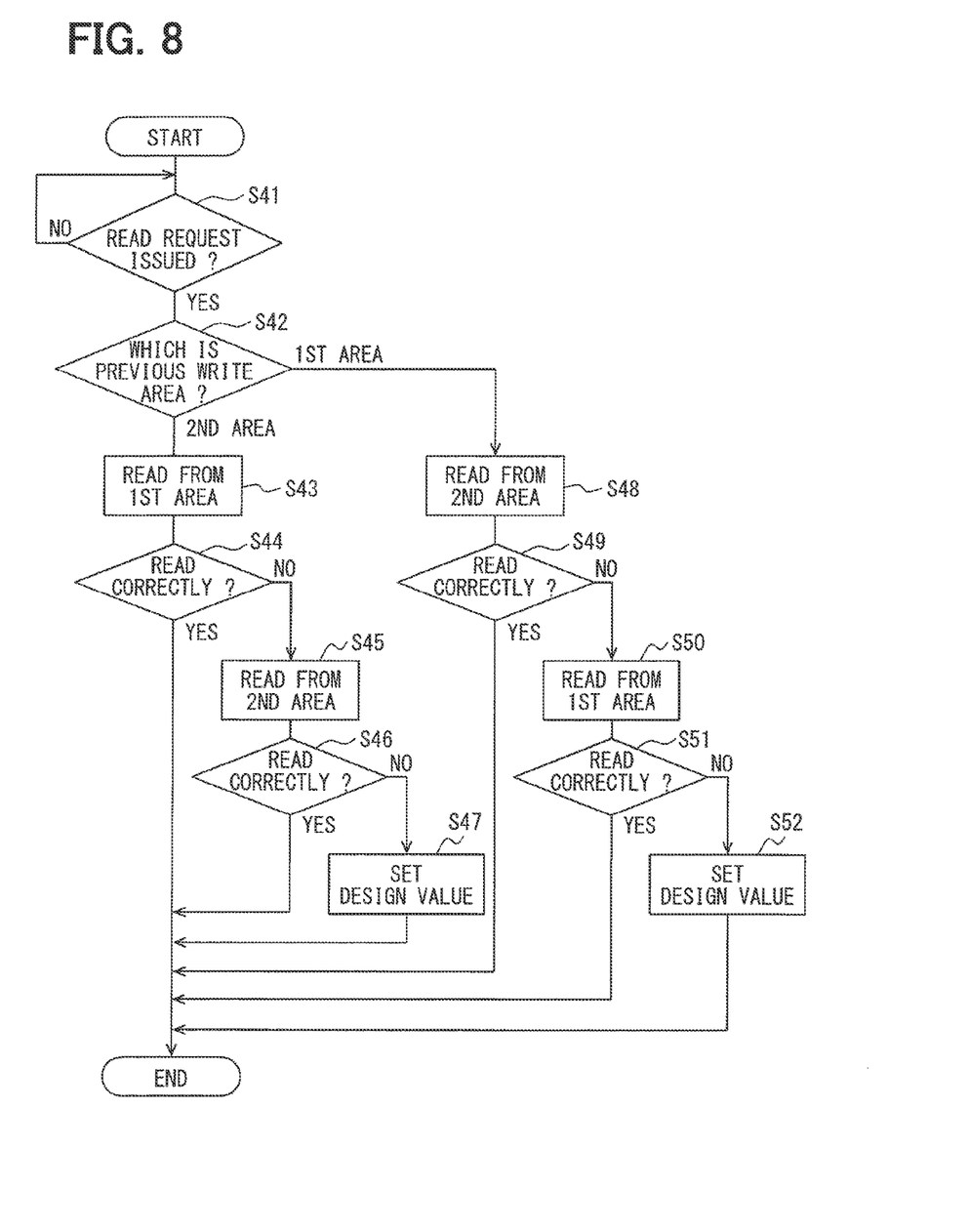
FIG. 8 is a flowchart the read process of the estimated temperature in the third embodiment of the present disclosure.

Hereafter, with reference to the flowchart of FIG. 8, the read process of the estimated temperature Te performed by the temperature estimator 21 is described.

First, the temperature estimator 21 determines whether the read request of the estimated temperature Te has been issued (S41). For example, it is determined that the read request has been issued by the temperature estimator 21 at the time of the reboot/restart of the control unit 11.

When it is determined that the read request has been issued by the temperature estimator 21 (S41:YES), with reference to the setup storage area of the EEPROM 26, it is determined that "the previous write area" is set to which one of the first area and the second area (S42).

On the other hand, when it is determined that the read request has not been issued (S41:NO), the process returns to S41, and S41 is repeated until it is determined that the write request has been issued.

When it is determined that "the previous write area" is set as the second area in S42 (S42:2ND AREA), the temperature estimator 21 performs the read process of the first area of the EEPROM 26 (S43).

Then, it is determined whether the temperature estimator 21 has correctly read the estimated temperature Te from the first area (S44). When it is determined that the estimated temperature Te is correctly read from the first area (S44: YES), the read process ends.

On the other hand, when it is determined that the estimated temperature Te has not been correctly read from the first area in S44 (S44:NO), the process shifts to S45. In S45, the temperature estimator 21 performs the read process of reading the second area of the EEPROM 26.

It is then determined, after S45, whether the temperature estimator 21 could correctly read the estimated temperature Te from the second area (S46). When it is determined that the estimated temperature Te has been correctly read (S46: YES), the read process ends.

When it is determined, on the other hand, that the estimated temperature Te has not been correctly read/retrieved from the second area in S46 (i.e., when the estimated temperature Te could not be read from the first area or the second area of the EEPROM 26) (S46:NO), the process shifts to S47. In S47, the temperature estimator 21 sets a design value as the estimated temperature Te, and ends the read process.

Further, in S42, when it is determined that "the previous write area" is set as the first area (S42:1ST AREA), the temperature estimator 21 performs the above-described steps of S43 to S47, with the replacement (i.e., interchanging "the first area" and the "second area" (S48-S52)).

Operation of the Temperature Estimator 21

Figure 9:
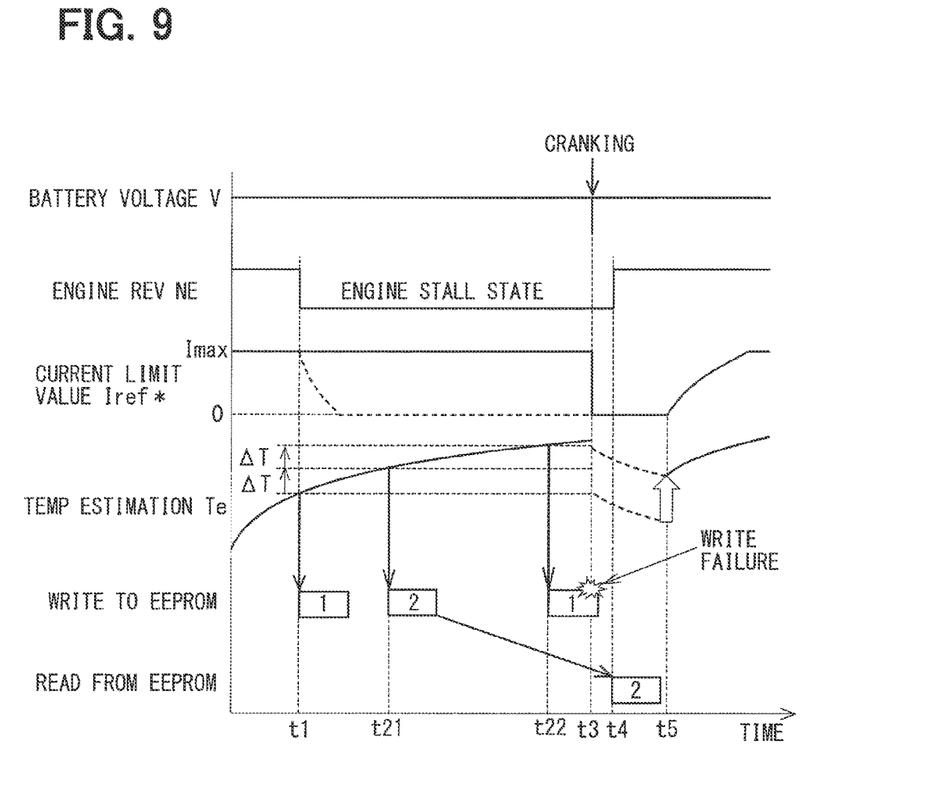
FIG. 9 is a time diagram of an operation of the motor controller in the third embodiment of the present disclosure.

Next, with reference to the time diagram shown in FIG. 9, an example of the operation of the temperature estimator 21 is described. The time diagram shown in FIG. 9 is similar to the time diagram described in the second embodiment as FIG. 6. Further, the timing of the write process and the current limit method of the electric current restrictor 22 shown in FIG. 9 are the same as the timing and the method in the second embodiment. In the following description, differences from the operation described in the second embodiment are mainly discussed.

If an engine stall is caused at time t1, the temperature estimator 21 determines that the write request has been issued (S31), and performs steps S32 and thereafter. Here, when the previous writing area is set as "the second area," the temperature estimator 21 writes the estimated temperature Te currently calculated at time t1 to the first area of the EEPROM 26, and sets the previous write area as "the first area."

At time t21 in the engine stall state, suppose that the estimated temperature Te has risen to a value which is higher than the previous write value by the preset temperature difference ΔT (i.e., has risen from a time-t1 value to a time-t21 value). At such timing, the temperature estimator 21 determines that the write request has been issued (S31), and performs steps S32 and thereafter. The estimated temperature Te currently calculated at time t21 is written to the second area of the EEPROM 26 by such steps, and the previous write area is set as "the second area."

Then, at time t22 still in the engine stall state, suppose that the estimated temperature Te has risen to the next value that is higher than the time-t21 value by the preset temperature difference ΔT (i.e., to a time-t22 value). At such timing, the temperature estimator 21 determines that the write request has been issued (S31), and starts to perform steps S32 and thereafter.

However, suppose that the following incident happens, that is, while the estimated temperature Te of time t21 is written to the first area of the EEPROM 26, a cranking is performed at time t3. At such timing, the control unit 11 is reset, thereby the writing to the first area fails. Thus, the data in the first area is damaged, and the setup information of "the previous write area" stays unchanged (i.e., not updated).

Then, at time t4, the control unit 11 reboots/restarts, and the temperature estimator 21 determines that the read request has been issued (S41), and performs steps S42 and thereafter. Here, the temperature estimator 21 reads the estimated temperature Te at time t21 from the second area, which is set as "the previous write area."

Effectiveness (1) As mentioned above, according to the third embodiment, when a write request is issued, the estimated temperature Te is written in turns either to the first area or to the second area.

Therefore, the motor controller 10 of the third embodiment is enabled to correctly read, from one of the two areas, the estimated temperature Te, after the reboot/restart of the control unit 11, even when writing to one of the two areas (i.e., the first or second area) fails. Thereby, the estimated temperature Te is safely readable.

Further, by calculating the estimated temperature Te based on the read value, an overheat protection control of the element of the motor driver 12 is appropriately performed. In other words, the reliability of the overheat protection control for protecting the element of the motor driver 12 is improved even by the third embodiment.

(2) Just like the second embodiment, during the engine stall period, in case that the estimated temperature Te changes to a value which is different from the value of the previous write time by an amount of the preset temperature difference ΔT, it is determined in the third embodiment that the write request has been issued.

Here, in the third embodiment, since the write process is performed in turns either to the first area or to the second area each time a write request is issued, in comparison to the second embodiment, the number of write operations to each of the two areas is substantially halved.

Therefore, according to the third embodiment, the life of the EEPROM 26 is further extended, while storing the estimated temperature Te in the EEPROM 26 at a timing as close to the resetting as possible.

Other Embodiments (a) In the above embodiment, the motor 80 is implemented as a DC motor. However, the present disclosure is not restricted to such configuration. For example, in other embodiments, the motor 80 may be a brushless motor. In such case, the motor driver 12 is an inverter, and the element of the motor driver 12 is the switching element which constitutes the inverter.

(b) In the above embodiment, the temperature estimator 21 calculates the estimated temperature Te of the element of the motor driver 12. However, the estimated temperature Te of, for example, a winding of the motor 80 may be calculated in other embodiments.

(c) In the above embodiment, the temperature estimator 21 calculates the estimated temperature Te based on the detected temperature Ts detected by the temperature sensor 14. However, in other embodiments, the temperature estimator 21 may calculate the estimated temperature Te based on the motor current detection value Im which is detected by the motor current detector 13.

(d) According to the second and third embodiments, when the estimated temperature Te becomes a value which is different from the previous write value by the preset temperature difference ΔT at the engine stall timing or during the engine stall period, it is determined that a write request is issued. However, the determination timing determining that the write request is issued is not restricted to such timing in the above embodiments.

For example, the temperature estimator 21 may determine that the write request is issued, when the control unit 11 starts to perform a control, or when the engine is in a stop state, which is not necessarily a stall state. The stop of the engine may be determined based on one of an ignition signal representing an ON-OFF state of the ignition switch 52, a power supply voltage V detected by a power supply voltage detector 31, and the engine revolution number NE detected by an engine revolution detector 32.

Further, not only during the engine stall period but also during the calculation of the estimated temperature Te, the write request may be determined to have been issued when the estimated temperature Te becomes a value which is different from a value of the previous write time by the preset temperature difference ΔT.

(e) In other embodiments, the temperature estimator 21 may determine whether the write request has been issued or not (S11, S31) at preset intervals during the control of the motor 80. In such case, at the time of determining that a write request has been issued, a criterion of whether a current value of the estimated temperature Te is different from a value of the previous write time by the preset temperature difference ΔT or more may be used.

(f) In other embodiments, the preset temperature difference ΔT for the determination of the change of the estimated temperature Te may be different values in different temperature ranges.

(g) According to the first embodiment, the control method of the current limit value Iref* is not limited a certain method. Further, the current limit value Iref* maintained to the rated value Imax from the engine stall timing to the cranking timing in second and third embodiments may be differently configured. That is, as long as the current limit value Iref* is kept to a value of the engine operation time for a certain period of time after the engine stall timing, the current limit value Iref* is may be lowered than the rated value Imax, or may be decreased to zero at some point.

Further, the control method of the current limit value Iref* described in the second and third embodiments is not necessarily limited to the engine stall time, but may also be applicable to the engine stop time caused by the turning OFF of the ignition switch 52.

(h) In the above embodiment, the first area and the second area of the EEPROM 26 are distinguished by their address, the first area and the second area may be provided in the respectively different memory element. Further, the non-volatile memory may be other memory device other than the EEPROM 26 as long as the non-volatile memory is capable of storing data when no electric power is supplied thereto.

(i) In the above embodiment, the cause of the write failure is described as a reset operation during the write process. However, the present disclosure may be applicable to the write failure induced by other causes. That is, the present disclosure is capable of providing a safe reading of the estimated temperature Te and an appropriate overheat protection control for the write failure due to other causes.

(j) In the above-mentioned embodiment, the electric power steering device 1 is a column type. However, the electric power steering device 1 of a rack type may also be used.

In other embodiments, the motor controller 10 may be used in a device other than the electric power steering device. In such case, turning ON and OFF of the ignition switch 52 in the above description may be replaced with turning ON and OFF of a power supply.

Although the present disclosure has been fully described in connection with preferred embodiment thereof with reference to the accompanying drawings, it is to be noted that various changes and modifications will become apparent to those skilled in the art, and such changes, modifications, and summarized schemes are to be understood as being within the scope of the present disclosure as defined by appended claims.

What is claimed is:

1. A motor controller for controlling an electric motor in a vehicle, the motor controller comprising:
    a motor driver having two or more switching elements, the motor driver configured to supply electric power to the motor;
    a control unit including a microcomputer having a non-volatile memory, the control unit configured to receive sensor data, to process the sensor data, and to output a voltage instruction value to the motor driver based on the processed sensor data to control a supply of electric power from the motor driver to the motor;
    a speed sensor in connection with a steering shaft, the speed sensor configured to detect a speed of the steering shaft and to output a speed signal based on the detected speed to the control unit;
    a torque sensor in connection with the steering shaft, the torque sensor configured to detect a torque of the steering shaft and to output a torque signal based on the detected torque to the control unit;
    a temperature sensor configured to sense an ambient air temperature of an air around the two or more switching elements and to output a temperature signal based on the sensed ambient air temperature to the control unit; and
    a motor current detector configured to detect an amount of electric current supplied by the motor driver to the motor, wherein
    the control unit is further configured to
        calculate an estimated temperature value based on the temperature signal,
        determine the voltage instruction value using the speed signal, the torque signal, and the estimated temperature value,
        determine an output current for the supply of electric power from the motor driver to the motor by determining a first current value based on the speed signal, the torque signal, and the estimated temperature value,
        determine a second current value based on the amount of electric current detected by the motor current detector,
        receive a power supply voltage from a vehicle power supply detector indicating power is supplied to the vehicle,
        receive an ignition signal from an ignition switch indicating an ON and OFF state of the ignition switch, and
        save the estimated temperature value to a first address and a second address of the non-volatile memory when the control unit receives the power supply voltage and the ignition signal.

2. The motor controller of claim 1, wherein
    when the control unit is rebooted, the control unit is further configured to read the estimated temperature value from at least one of the first address and the second address of the non-volatile memory and use the read estimated temperature value to determine the output current for the supply of electric power from the motor driver to the motor.

3. A motor controller for controlling an electric motor in a vehicle, the motor controller comprising:
    a motor driver having two or more switching elements, the motor driver configured to supply electric power to the motor;
    a control unit including a microcomputer having a non-volatile memory, the control unit configured to receive sensor data, to process the sensor data, and to output a voltage instruction value to the motor driver based on the processed sensor data to control a supply of electric power from the motor driver to the motor;
    a speed sensor in connection with a steering shaft, the speed sensor configured to detect a speed of the steering shaft and to output a speed signal based on the detected speed to the control unit;
    a torque sensor in connection with the steering shaft, the torque sensor configured to detect a torque of the steering shaft and to output a torque signal based on the detected torque to the control unit;
    a temperature sensor configured to sense an ambient air temperature of an air around the two or more switching elements and to output a temperature signal based on the sensed ambient air temperature to the control unit; and
    a motor current detector configured to detect an amount of electric current supplied by the motor driver to the motor, wherein
    the control unit is further configured to
        calculate a first estimated temperature value and a second estimated temperature value based on the temperature signal,
        determine the voltage instruction value using the speed signal, the torque signal, and at least one of the first estimated temperature value and the second estimated temperature value,
        determine an output current for the supply of electric power from the motor driver to the motor by determining a first current value based on the speed signal, the torque signal, and at least one of the first estimated temperature value and the second estimated temperature value, determine a second current value based on the amount of electric current detected by the motor current detector, receive a power supply voltage from a vehicle power supply detector indicating power is supplied to the vehicle, receive an ignition signal from an ignition switch indicating an ON and OFF state of the ignition switch, and save the first estimated temperature value to a first address of the non-volatile memory and save the second estimated temperature value to a second address of the non-volatile memory when the control unit receives the power supply voltage and the ignition signal.

4. The motor controller of claim 3, wherein
when the control unit is rebooted, the control unit is further configured to read at least one of the first estimated temperature value and the second estimated temperature value from at least one of the first address and the second address of the non-volatile memory and use at least one of the read first estimated temperature value and the read second estimated temperature value to determine the output current for the supply of electric power from the motor driver to the motor.

* * * * *